(12) United States Patent
Aggarwala et al.

(10) Patent No.: US 9,175,567 B2
(45) Date of Patent: Nov. 3, 2015

(54) LOW LOSS AIRFOIL PLATFORM TRAILING EDGE

(75) Inventors: Andrew S. Aggarwala, Vernon, CT (US); Thomas J. Praisner, Colchester, CT (US)

(73) Assignee: United Technologies Corporation, Hartford, CT (US)

( * ) Notice: Subject to any disclaimer, the term of this patent is extended or adjusted under 35 U.S.C. 154(b) by 916 days.

(21) Appl. No.: 13/408,040

(22) Filed: Feb. 29, 2012

(65) Prior Publication Data

US 2013/0224014 A1    Aug. 29, 2013

(51) Int. Cl.
*F01D 5/14* (2006.01)

(52) U.S. Cl.
CPC ............ *F01D 5/143* (2013.01); *F05D 2240/80* (2013.01); *F05D 2260/60* (2013.01); *Y02T 50/673* (2013.01)

(58) Field of Classification Search
CPC ............. F01D 5/12; F01D 5/14; F01D 5/141; F01D 5/142; F01D 5/143
See application file for complete search history.

(56) References Cited

U.S. PATENT DOCUMENTS

| 5,397,215 | A | 3/1995 | Spear et al. |
| 5,466,123 | A * | 11/1995 | Rose ..................... 415/182.1 |
| 7,249,928 | B2 | 7/2007 | Klasing et al. |
| 7,334,983 | B2 | 2/2008 | Alvanos et al. |
| 7,632,071 | B2 | 12/2009 | Charbonneau et al. |
| 2006/0275126 | A1* | 12/2006 | Heitland et al. ......... 416/193 A |
| 2008/0145208 | A1 | 6/2008 | Klasing et al. |
| 2010/0143139 | A1* | 6/2010 | Pandey et al. ................. 416/179 |

FOREIGN PATENT DOCUMENTS

EP    1531233 A2    5/2005

OTHER PUBLICATIONS

The Mar. 26, 2013 PCT International Search Report for International Application No. PCT/US13/20962.

* cited by examiner

*Primary Examiner* — Edward Look
*Assistant Examiner* — Christopher J Hargitt
(74) *Attorney, Agent, or Firm* — Kinney & Lange, P.A.

(57) ABSTRACT

An airfoil platform comprises a leading edge portion and a trailing edge portion. The trailing edge portion comprises a first region having a convex flowpath contour, a second region having an intermediate flowpath contour extending downstream from the convex flowpath contour, and a third region having a concave or linear flowpath contour extending downstream from the intermediate flowpath contour to a downstream end of the trailing edge portion of the platform.

25 Claims, 6 Drawing Sheets

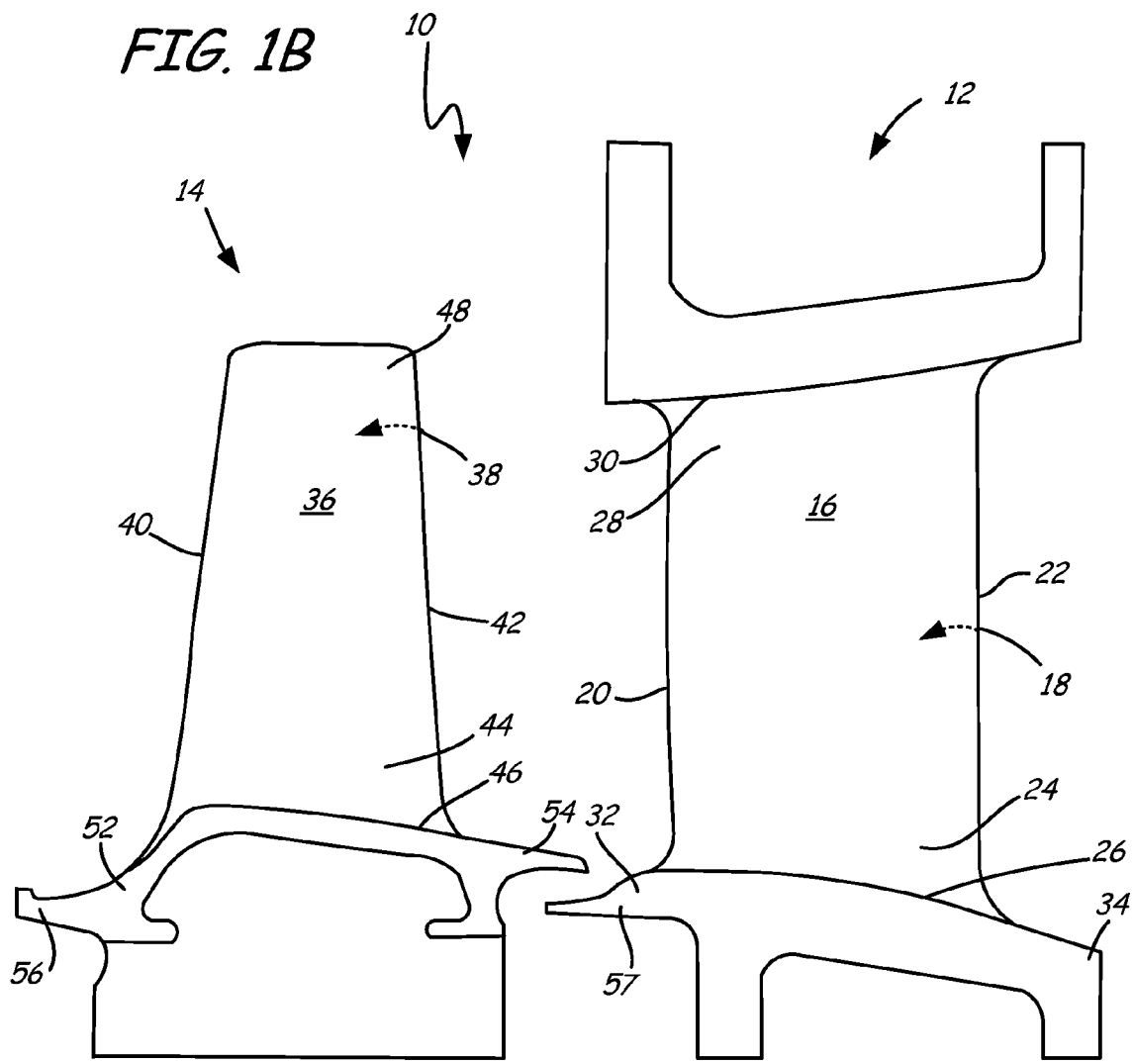

LOW LOSS AIRFOIL PLATFORM TRAILING EDGE

BACKGROUND

This invention relates generally to turbomachinery, and specifically to gas turbine engine components. In particular, the invention relates to airfoil components exposed to hot working fluid flow, including, but not limited to, rotor blades and stator vanes for the turbine and compressor section of a turbofan engine, or other gas turbine engine.

Gas turbine engines are rotary-type combustion turbine engines built around a power core made up of a compressor, combustor and turbine, arranged in flow series with an upstream inlet and downstream exhaust. The compressor section compresses air from the inlet, which is mixed with fuel in the combustor and ignited to generate hot combustion gas. The turbine section extracts energy from the expanding combustion gas, and drives the compressor section via a common shaft. Expanded combustion products are exhausted downstream, and energy is delivered in the form of rotational energy in the shaft, reactive thrust from the exhaust, or both.

Gas turbine engines provide efficient, reliable power for a wide range of applications in aviation, transportation and industrial power generation. Small-scale gas turbine engines typically utilize a one-spool design, with co-rotating compressor and turbine sections. Larger-scale combustion turbines including jet engines and industrial gas turbines (IGTs) are generally arranged into a number of coaxially nested spools. The spools operate at different pressures, temperatures and spool speeds, and may rotate in different directions.

Individual compressor and turbine sections in each spool may also be subdivided into a number of stages, formed of alternating rows of rotor blade and stator vane airfoils. The airfoils are shaped to turn, accelerate and compress the working fluid flow, or to generate lift for conversion to rotational energy in the turbine.

Industrial gas turbines often utilize complex nested spool configurations, and deliver power via an output shaft coupled to an electrical generator or other load, typically using an external gearbox. In combined cycle gas turbines (CCGTs), a steam turbine or other secondary system is used to extract additional energy from the exhaust, improving thermodynamic efficiency. Gas turbine engines are also used in marine and land-based applications, including naval vessels, trains and armored vehicles, and in smaller-scale applications such as auxiliary power units.

Aviation applications include turbojet, turbofan, turboprop and turboshaft engine designs. In turbojet engines, thrust is generated primarily from the exhaust. Commercial fixed-wing aircraft generally employ turbofan and turboprop configurations, in which the low pressure spool is coupled to a propulsion fan or propeller. Turboshaft engines are employed on rotary-wing aircraft, including helicopters, typically using a reduction gearbox to control blade speed. Unducted (open rotor) turbofans and ducted propeller engines also known, in a variety of single-rotor and contra-rotating designs with both forward and aft mounting configurations.

Modern aircraft engines generally utilize two and three-spool gas turbine configurations, with a corresponding number of coaxially rotating turbine and compressor sections. In two-spool designs, the high pressure turbine drives a high pressure compressor, forming the high pressure spool or high spool. The low-pressure turbine drives the low spool and fan section, or a shaft for a rotor or propeller. In three-spool engines, there is also an intermediate pressure spool. Aviation turbines are also used to power auxiliary devices including electrical generators, hydraulic pumps and elements of the environmental control system, for example using bleed air from the compressor or via an accessory gearbox.

Turbofan engines are commonly divided into high and low bypass configurations. High bypass turbofans generate thrust primarily from the fan, which accelerates airflow through a bypass duct oriented around the engine core. This design is common on commercial aircraft and transports, where noise and fuel efficiency are primary concerns. The fan rotor may also operate as a first stage compressor, or as a pre-compressor stage for the low-pressure compressor or booster module. Variable-area nozzle surfaces can also be deployed to regulate the bypass pressure and improve fan performance, for example during takeoff and landing. Advanced turbofan engines may also utilize a geared fan drive mechanism to provide greater speed control, reducing noise and increasing engine efficiency, or to increase or decrease specific thrust.

Low bypass turbofans produce proportionally more thrust from the exhaust flow, generating greater specific thrust for use in high-performance applications including supersonic jet aircraft. Low bypass turbofan engines may also include variable-area exhaust nozzles and afterburner or augmentor assemblies for flow regulation and short-term thrust enhancement. Specialized high-speed applications include continuously afterburning engines and hybrid turbojet/ramjet configurations.

Across these applications, turbine performance depends on the balance between higher pressure ratios and core gas path temperatures, which tend to increase efficiency, and the related effects on service life and reliability due to increased stress and wear. This balance is particularly relevant for airfoil components in the hot sections of the compressor and turbine, where advanced cooling configurations and thermal coating systems are utilized in order to improve airfoil performance.

SUMMARY

This invention concerns an airfoil platform with a low loss trailing edge. The airfoil is defined by pressure and suction surfaces extend axially from a leading edge to a trailing edge, and radially from an inner diameter (or root) section to an outer diameter (or tip) section. The platform is adjacent the root section.

The platform has a leading edge portion and a trailing edge portion, the trailing edge portion extending to a downstream end of the platform. The trailing edge portion has a first region with a convex flowpath contour, a second region with an intermediate flowpath contour, and a third region with a concave or linear flowpath contour.

The intermediate flowpath contour extends from the convex flowpath contour of the first region to the concave or linear contour of the third region. The concave or linear contour of the third region extends from the intermediate contour of the second region to the downstream end of the platform.

In additional or alternative embodiments of any of the foregoing embodiments, the convex flowpath contour and the intermediate flowpath contour have matching slopes at a transition between the first region and the second region, and the intermediate flowpath contour and the concave or linear flowpath contour have matching slopes at a transition between the second region and the third region. In additional or alternative embodiments of any of the foregoing embodiments, the intermediate flowpath contour is convex adjacent the first region and concave adjacent the third region. In additional or alternative embodiments of any of the foregoing embodiments, the convex flowpath contour of the first region has a radius of curvature between one quarter and twice a radial height of the trailing edge portion, the radial height defined between an undersurface of the platform and a transition to the first region. In additional or alternative embodiments of any of the foregoing embodiments, the concave flowpath contour of the third region has a radius of curvature between one quarter and twice the radial height of the trailing edge portion.

In additional or alternative embodiments of any of the foregoing embodiments, the third region has a substantially linear flowpath contour extending from the second region to the downstream end of the trailing edge portion. In additional or alternative embodiments of any of the foregoing embodiments, the second region has a substantially linear flowpath contour extending from the first region to the third region. In additional or alternative embodiments of any of the foregoing embodiments, the platform comprises a platform undersurface, the platform undersurface extends along the trailing edge portion and defines an angle of at least two degrees with respect to the platform undersurface extending upstream of the trailing edge portion.

In additional or alternative embodiments of any of the foregoing embodiments, a stator airfoil comprises an inner diameter platform as described. In additional or alternative embodiments of any of the foregoing embodiments, a turbine or compressor stage comprises a plurality of circumferentially arranged stator airfoils as described, and further comprises a plurality of rotor airfoils circumferentially arranged downstream of the stator airfoils. In additional or alternative embodiments of any of the foregoing embodiments, each of the rotor airfoils comprises an inner diameter platform having a seal process, the seal process extending axially upstream to a position located radially inward of the trailing edge portion of the inner diameter platform of the stator airfoil.

In additional or alternative embodiments of any of the foregoing embodiments, a rotor airfoil comprises an inner diameter platform as described. In additional or alternative embodiments of any of the foregoing embodiments, a turbine or compressor stage comprises a plurality of circumferentially arranged rotor airfoils as described, and further comprises a plurality of stator airfoils circumferentially arranged downstream of the rotor airfoils. In additional or alternative embodiments of any of the foregoing embodiments, each of the stator airfoils comprises an inner diameter platform having a seal process, the seal process extending axially upstream to a position located radially inward of the trailing edge portion of the inner diameter platform of the rotor airfoil.

In additional or alternative embodiments of any of the foregoing embodiments, an airfoil comprises pressure and suction surfaces extending axially from a leading edge to a trailing edge and radially from an inner section to an outer section, and a platform adjacent the inner section. The platform has a trailing edge section with a contoured flowpath, the contoured flowpath comprising an upstream region with a convex contour, an intermediate region with a continuous contour extending downstream from the convex contour of the upstream region, and a downstream region with a concave or linear contour extending from the intermediate region to a downstream end of the platform.

In additional or alternative embodiments of any of the foregoing embodiments, the trailing edge section of the platform extends for an axial length along the upstream region, the intermediate region and the downstream region, where the axial length is at least twice times a radial thickness of the trailing edge section of the platform. In additional or alternative embodiments of any of the foregoing embodiments, each of the upstream region and the downstream region has a radius of curvature between one fourth of the radial thickness of the trailing edge section and twice the radial height of the trailing edge section, inclusive.

In additional or alternative embodiments of any of the foregoing embodiments, the continuous contour of the intermediate region has a first slope matching the convex contour of the upstream region, and a second slope matching the concave or linear contour of the downstream region. In additional or alternative embodiments of any of the foregoing embodiments, the continuous contour of the intermediate region is convex adjacent the convex contour of the upstream region and concave or linear adjacent the concave or linear contour of the downstream region. In additional or alternative embodiments of any of the foregoing embodiments, the undersurface of the platform is angled to decrease a vertical height of the downstream end of the platform.

In additional or alternative embodiments of any of the foregoing embodiments, an airfoil comprises pressure and suction surfaces extending axially from a leading edge to a trailing edge and radially from an inner section to an outer section, an outer diameter platform adjacent the outer section, and an inner diameter platform adjacent the inner section, the inner diameter platform having a leading edge portion and a trailing edge portion. The trailing edge portion comprises an upstream flowpath region having a convex contour, a downstream flowpath region having a concave or linear contour, and an intermediate flowpath region extending between the upstream flowpath region and the downstream flowpath region. The intermediate flowpath region has a first slope matching the convex contour of the upstream flowpath region and a second slope matching the concave or linear contour of the downstream flowpath region.

In additional or alternative embodiments of any of the foregoing embodiments, the downstream flowpath region has a substantially linear contour extending to a downstream end of the inner diameter platform. In additional or alternative embodiments of any of the foregoing embodiments, the intermediate flowpath region has a substantially linear contour extending from the upstream flowpath region to the downstream flowpath region, such that the first and second slopes are substantially equal.

In additional or alternative embodiments of any of the foregoing embodiments, a stator stage comprises a plurality of circumferentially arranged airfoils as described. In additional or alternative embodiments of any of the foregoing embodiments, a rotor stage comprises a plurality of circumferentially arranged rotor airfoils as described.

BRIEF DESCRIPTION OF THE DRAWINGS

FIG. 1B is an alternate side view of a turbine or compressor stage for a gas turbine engine.

DETAILED DESCRIPTION

Figure 1A:
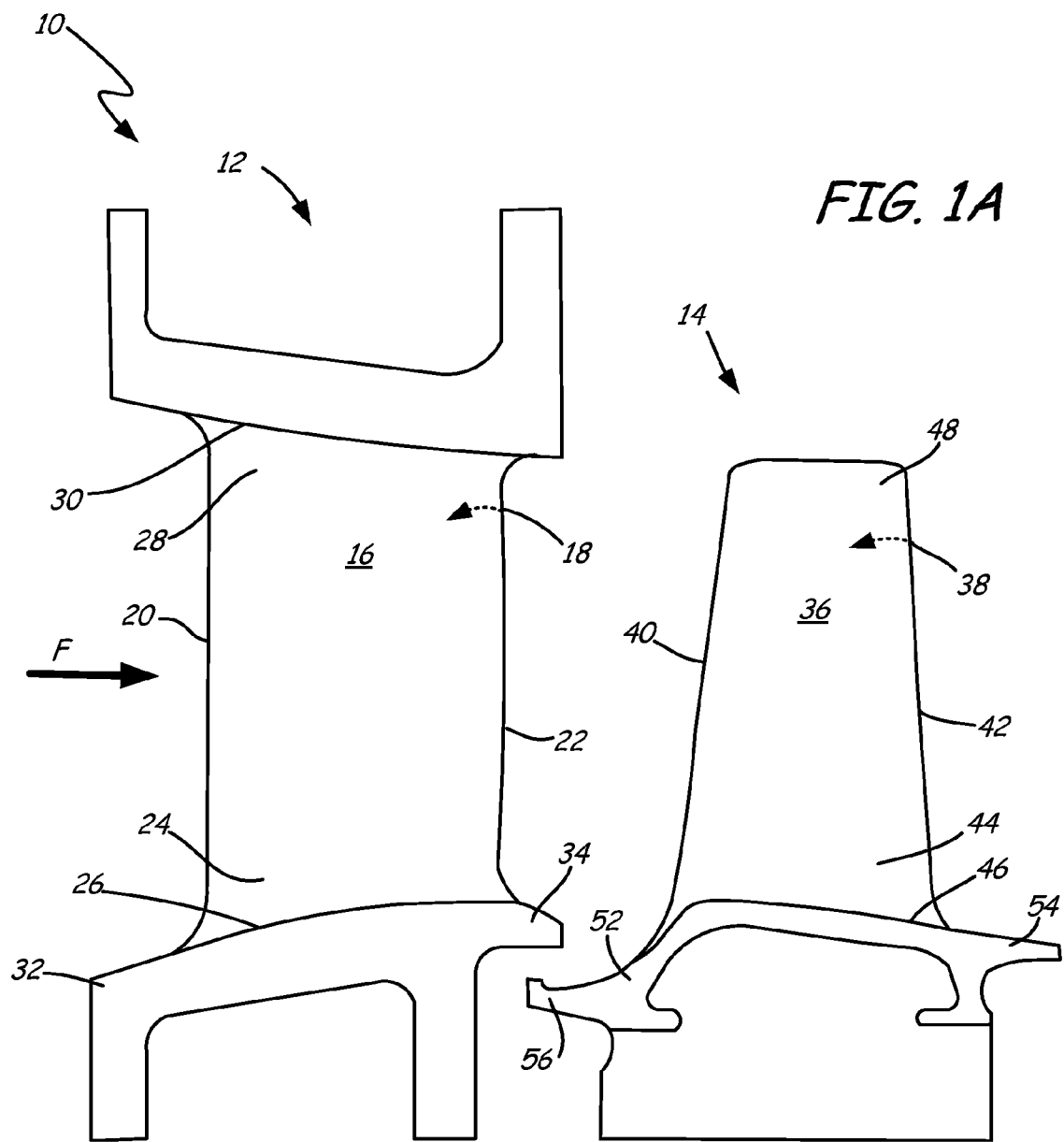
FIG. 1A is a side view of a turbine or compressor stage for a gas turbine engine.

FIG. 1A is a side view of gas turbine engine stage 10, for example a turbine or compressor stage for a gas turbine engine, or other turbomachine. Gas turbine engine stage 10 includes a stage of circumferentially arranged stator airfoils 12, followed by a stage of circumferentially arranged rotor airfoils 14. In this particular example, stator stage airfoils 12 are positioned upstream of rotor stage airfoils 14 along working fluid flow F, for example air, steam or combustion gas. Conversely, rotor stage airfoils 14 are positioned downstream of stator stage airfoils 12.

Each stator airfoil (or vane) 12 is defined between a concave pressure surface 16 (front) and a convex suction surface 18 (back). Pressure and suction surfaces 16 and 18 extend axially from leading edge 20 of stator airfoil 12 to trailing edge 22, and radially from an inner diameter (ID) portion or root section 24, adjacent ID vane platform 26, to an outer diameter (OD) portion or tip section 28, adjacent OD vane platform 30.

Each rotor airfoil (or blade) 14 is defined between a convex suction surface 36 (front) and a concave pressure surface 38 (back). Suction and pressure surfaces 36 and 38 extend axially from leading edge 40 of rotor airfoil 14 to trailing edge 42, and radially from ID or root section 44, adjacent blade platform 46, to OD or tip section 48. Depending on configuration, tip section 48 may be shrouded, or positioned with rotational clearance to a stationary engine casing structure or blade outer air seal (BOAS).

ID and OD stator (vane) platforms 26 and 30 define inner and outer flowpaths or endwalls for working fluid flow through stage 10, extending downstream along stator stage airfoils 12 toward rotor stage airfoils 14. In particular, ID stator platform 26 extends from leading (or upstream) portion 32, oriented along leading edge 20 of stator airfoil 12, to trailing (or downstream) portion 34, oriented along trailing edge 22 of stator airfoil 12. Trailing edge portion 34 of ID vane platform 26 is contoured, as described below, in order to improve performance, including, but not limited to, flow performance along the transition region from stator stage airfoil 12 to rotor stage airfoil 14.

Rotor blade platform 46 extends from leading (or upstream) portion 52, oriented along leading edge 40 of rotor airfoil 14, to trailing (or downstream) portion 54, oriented along trailing edge 42, defining an inner (ID) flow boundary or flowpath contour for rotor airfoil 14. Leading edge portion 52 of blade platform 46 includes a sealing arrangement, for example an angel wing or discourager seal process 56 to reduce or prevent hot gas ingestion and improve cooling efficiency along the transition between stator stage airfoils 12 and rotor stage airfoils 14.

In the particular configuration of FIG. 1A, for example, discourager seal or angel wing process 56 extends axially forward from leading edge section 52 of blade platform 46, and is positioned beneath (radially inward of) trailing edge section 34 of ID vane platform 26. Seal process 56 is configured to work in cooperation with contoured trailing edge section 34 of ID vane platform 26, in order to reduce losses in the flow transition from stator stage 12 to rotor stage 14, and to provide additional improvements in turbine performance and cooling efficiency.

FIG. 1B is a side view of an alternate turbine or compressor stage 10. In this configuration, rotor stage airfoils 14 are arranged upstream of stator stage airfoils 12. Seal process 57 may be provided on inner stator platform 26, extending from upstream portion 32 to a position radially inward of downstream trailing edge 54 of rotor airfoil 14. Alternatively, the stator and rotor airfoils are interchanged, as described above. Thus, airfoil platforms 26 and 46 may refer either to stator or rotor platform structures, and contoured trailing edge portions 34 and 54 may be provided along the downstream end of either stator platform 26 or rotor platform 46.

Figure 2A:
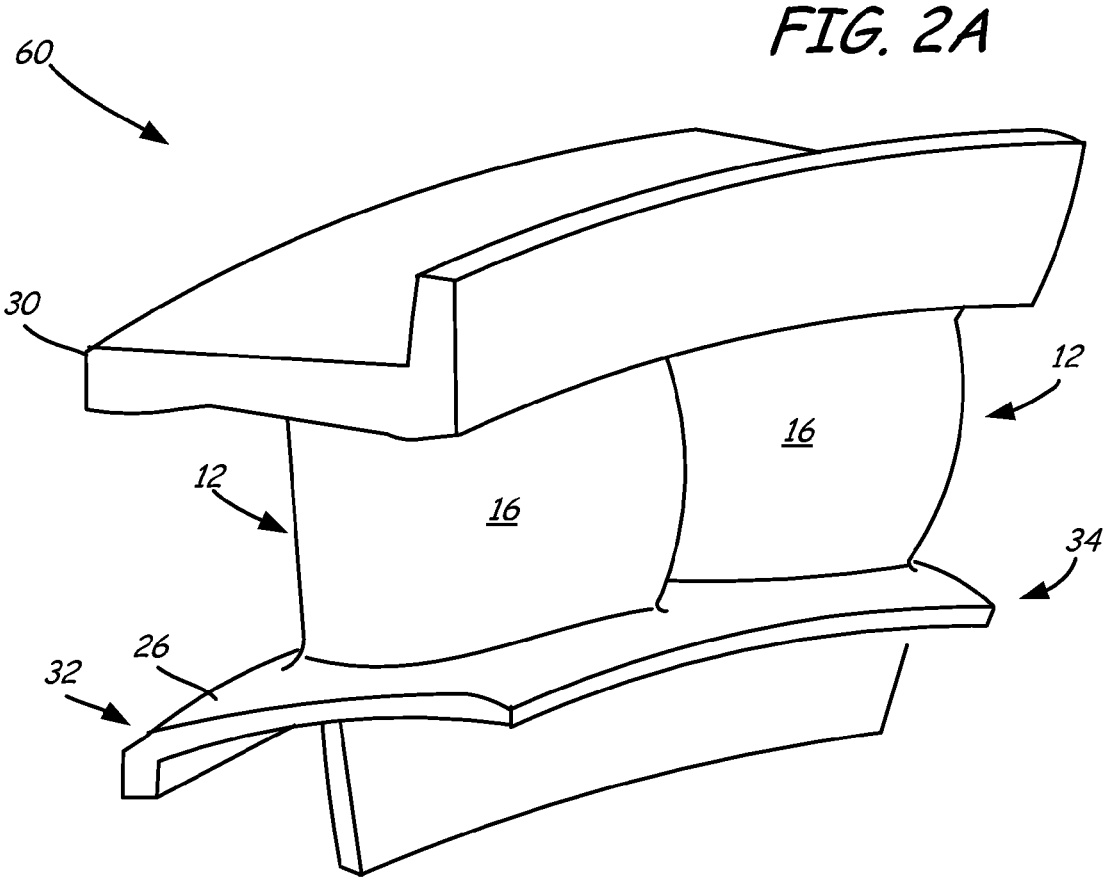
FIG. 2A is a perspective view of a stator airfoil assembly for a turbine or compressor stage.

FIG. 2A is a perspective view of stator vane pair or doublet assembly 60 with two stator airfoils 12. In this particular configuration, two adjacent stator airfoils 12 extend between a common ID vane platform 26 and a common OD vane platform 30, e.g., for use in gas turbine engine stage 10 of FIG. 1A or FIG. 1B, above. Alternatively, vane assembly 60 may be provided with a single (or singlet) stator airfoil 12, extending between discrete ID and OD platforms 26 and 30, or with three or more stator airfoils 12, extending between common ID and OD platforms 26 and 30.

Figure 2B:
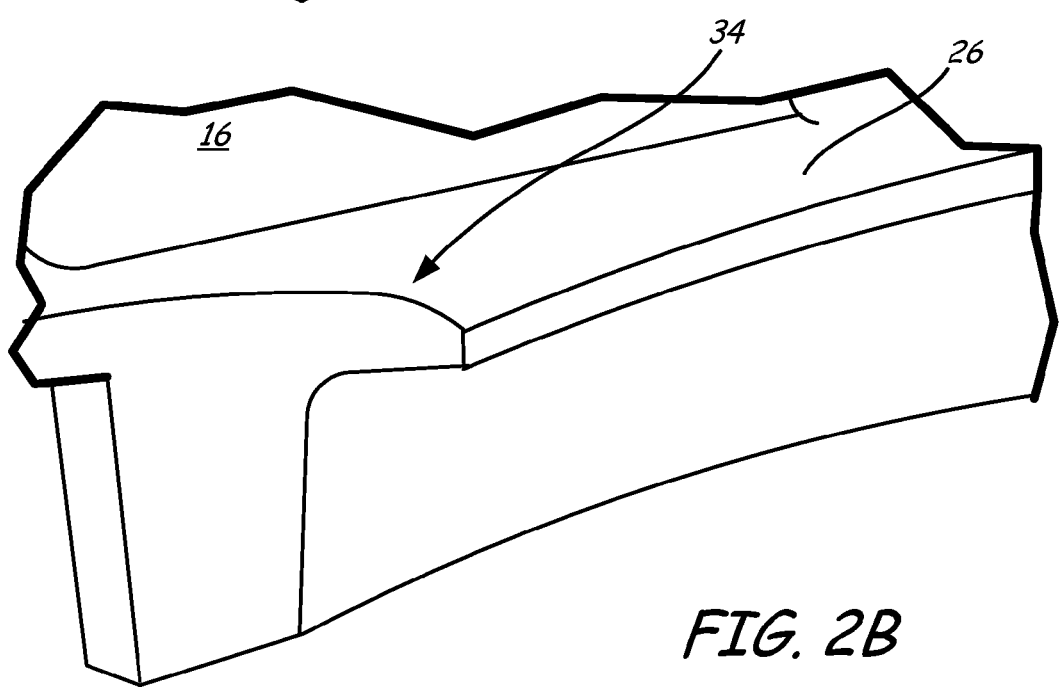
FIG. 2B is a perspective view of a platform trailing edge region for an airfoil.

FIG. 2B is a perspective view of ID platform 26, showing the contoured configuration of trailing edge portion 34. In this particular example, ID platform 26 forms the inner diameter (ID) flowpath for working fluid flow through a stator or vane stage, with trailing edge portion 34 contoured to reduce losses as described above. More generally, a contoured trailing edge portion 34 may be provided on a stator airfoil platform 26, as shown in FIG. 1A, or a contoured trailing edge portion 54 may be provided on a rotor airfoil platform 46, as shown in FIG. 1B. Depending on application, one or both of contoured trailing edge portions 34 and 54 may be provided with a three-part arcuate-spline-arcuate configuration, as shown in FIGS. 3A and 3B, an arcuate-linear configuration, as shown in FIG. 4A, an angled undersurface configuration, as shown in FIG. 4B, or a combination thereof.

Figure 3A:
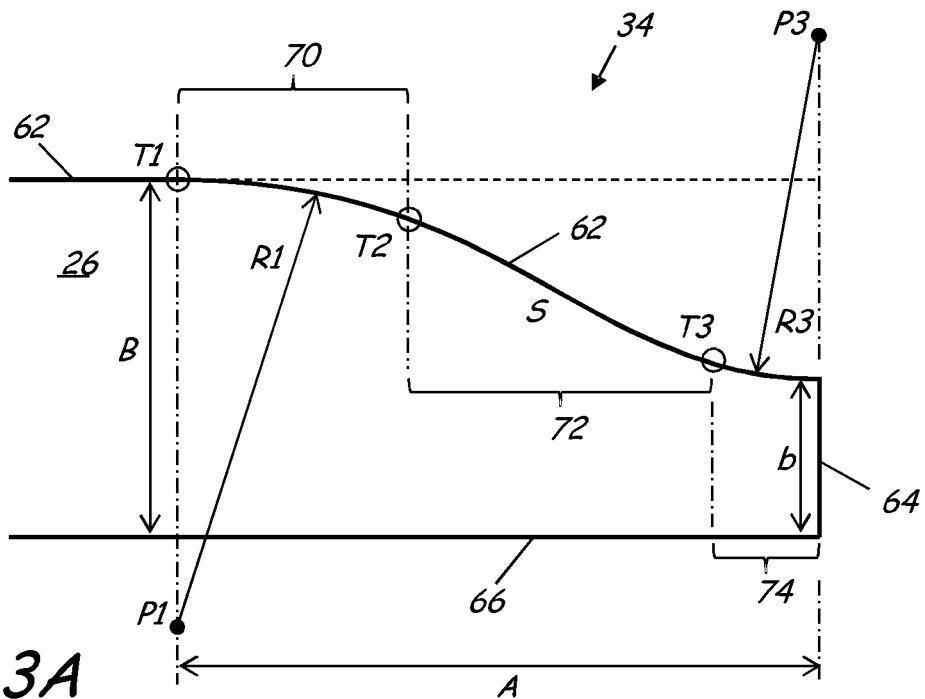
FIG. 3A is a schematic diagram illustrating an airfoil platform with an arcuate flowpath contour along the trailing edge.
Figure 3B:
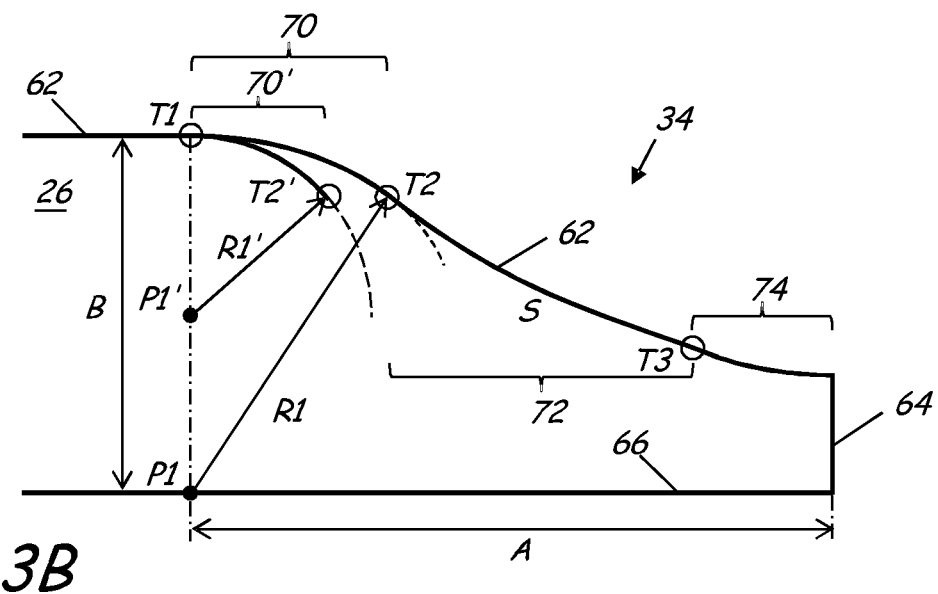
FIG. 3B is a schematic diagram illustrating different curvatures for the arcuate flowpath contour.
Figure 4A:
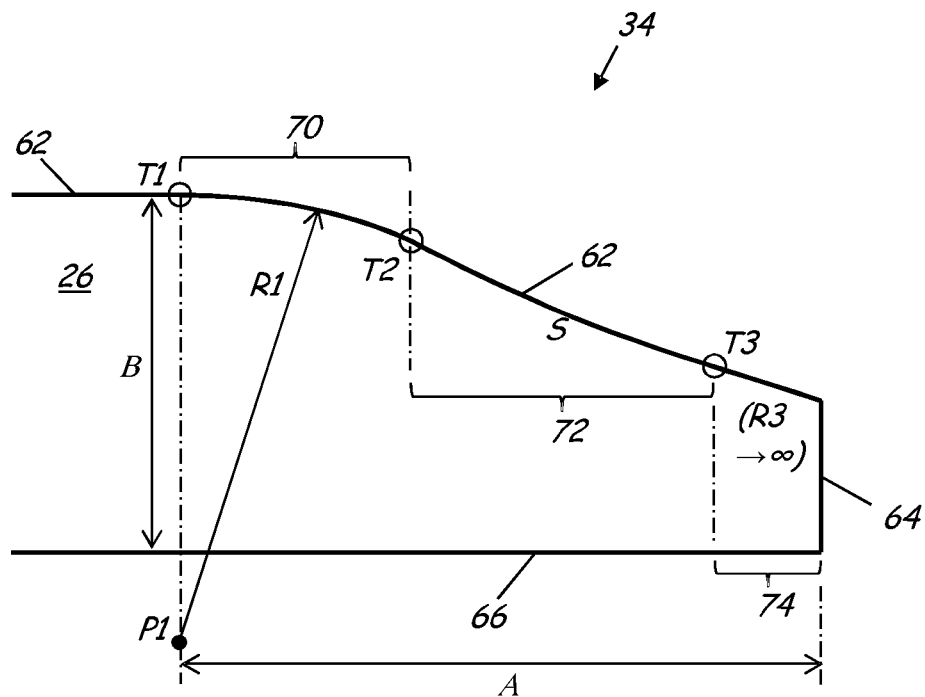
FIG. 4A is a schematic diagram illustrating an airfoil platform with arcuate and linear flowpath contours along the trailing edge.
Figure 4B:
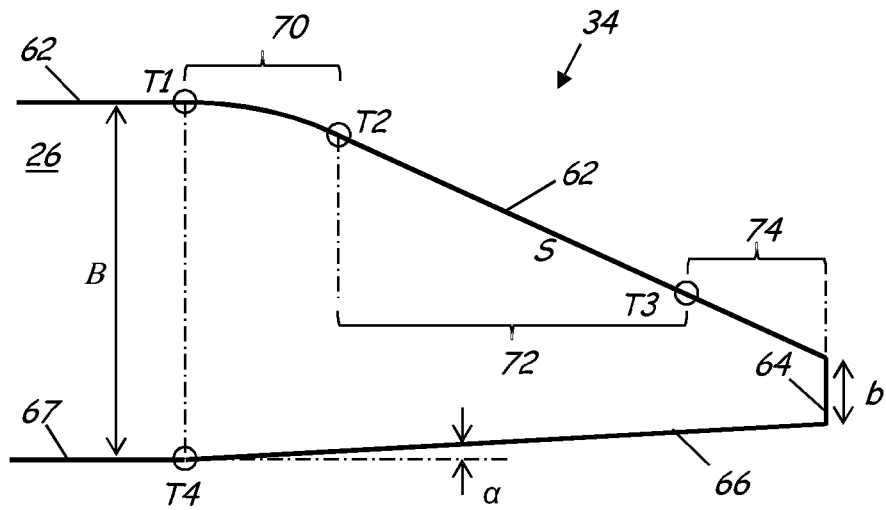
FIG. 4B is a schematic diagram illustrating an airfoil platform with an angled undersurface along the trailing edge.

FIG. 3A is a schematic diagram illustrating a three-part arcuate-spline-arcuate geometry along platform trailing edge section 34, for example along the ID platform trailing edge region or section of vane platform 26 on a stator airfoil, as shown in FIG. 1A. This example, however, is merely illustrative. Alternatively, the contour of platform trailing edge section 34 is provided as a contoured rotor platform trailing edge 54, along the ID platform trailing edge region or section of rotor platform 46 on a rotor airfoil, as shown in FIG. 1B. Thus, contoured airfoil platform trailing edge portion 34, as described herein, and as shown in any of FIGS. 3A, 3B, 4A and 4B, may be provided either on a stator platform such as ID vane or stator platform 26, or on a rotor platform such as ID blade or rotor platform 46.

As shown in FIG. 3A, stator or rotor platform trailing edge 34 (or 54, see FIG. 1B) extends axially along upper (flowpath) surface 62 from transition T1 to downstream (trailing) edge or end 64, and radially between flowpath surface 62 and undersurface 66 of stator or rotor platform 26. Axial length A of platform trailing edge 34 is defined between transition T1 and downstream end 64. Radial height or thickness B is defined between flowpath surface 62 and undersurface 66, as measured along a vertical or radial direction at transition (or tangency point) T1. In this particular configuration, downstream end 64 of platform trailing edge 34 is formed as substantially straight or linear segment, with vertical thickness or radial height b<B.

The flowpath contour of platform trailing edge 34 can be divided into three parts or regions 70, 72 and 74, extending axially through transitions T1, T2 and T3 to downstream end 64 of stator or rotor platform 26. In the configuration of FIG. 3A, for example, first (upstream) flowpath region 70 has convex curvature extending from transition T1 to transition T2, second (intermediate) flowpath region 72 has a compound curvature or spline contour extending from transition T2 to transition T3, and third (downstream) flowpath region 72 has concave curvature extending from transition T3 to downstream end 64 of platform trailing edge 34.

First transition T1 may be defined as a change in curvature or concavity (second derivative) along upper flowpath surface 62, at the upstream end of first region 70. Second transition T2 may be defined as a change in curvature or concavity between first region 70 and second region 72, and third transition T3 may be defined as a change in curvature or concavity between second region 72 and third region 74. For example, the change in curvature or concavity may be from zero to a positive definite or negative definite value. Alternatively, the change may be from a positive definite or negative definite value to zero, or between positive definite and negative definite values, in either order.

Depending on configuration, the slope (first derivative) may be continuous across one or more transitions T1, T2 and T3, so that the upstream and downstream flowpath regions have matching slope (or slopes) at one or more transitions T1, T2 and T3. In these configurations, the second derivative (curvature of concavity) may be continuous across transitions T1, T2 and T3. Alternatively, any one or more of transitions T1, T2 and T3 may be defined at a change in slope (first derivative), and the second derivative may not necessarily be continuous at each transition T1, T2, T3, but instead may be discontinuous at one or more of transitions T1, T2 and T3.

In one particular example of a three-part contour, first (upstream) region 70 of platform trailing edge 34 is formed as an arcuate segment with substantially convex radius of curvature R1, extending along flowpath surface 62 of platform 26 from transition T1 to second region 72 at transition T2. Second (intermediate) region 72 is formed as a smooth, continuous segment such as a spline, extending from first region 70 at transition T2 to third region 74 at transition T3. Third (downstream) region 74 is formed as an arcuate segment with substantially concave radius of curvature R2, extending from second region 72 at transition T3 to downstream end 64 of platform trailing edge 34.

Along first contour or flowpath region 70, convex radius of curvature R1 may be defined from point P1, vertically below and radially inward of transition T1. Along third contour or flowpath region 74, concave radius of curvature R3 may be defined from point P3, vertically above and radially outward of downstream end 64 of platform trailing edge 34. In some conventions, convex curvature R1 is considered positive and concave curvature R3 is considered negative, but positive or absolute values may also be used, or the sign convention may be reversed.

A spline contour or other continuous curvature defines an aerodynamically smooth flowpath along second (intermediate) region 72, between first (upstream) region 70 and third (downstream) region 74. In particular, the spline contour or other continuous curvature may define a substantially continuous slope (first derivative) through transition T2, between convex region 70 and intermediate region 72, and through transition T3, between intermediate region 72 and concave region 74.

The overall dimensions of platform trailing edge 34 may vary from application to application, along with the contours defined along flowpath surface 62. Radial height (or platform thickness) B, for example, typically scales with airfoil dimensions and engine size. Vertical height b of downstream end 64, in turn, may scale with platform thickness B, for example between 10% and 50% (that is, $0.1\, B \leq b \leq 0.5\, B$). Alternatively, vertical height b of downstream end 64 ranges up to 75% of platform thickness B (that is, $b \leq 0.75\, B$).

Axial length A of platform trailing edge 34 also scales with platform thickness B, in order to provide suitable contour lengths along flowpath regions 70, 72 and 74. For example, axial length A may have an upper limit of ten times platform thickness B ($A \leq 10\, B$), and a lower limit of two to five times platform thickness B ($A \geq 2.0\, B$, or $A \geq 5.0\, B$). Axial length A of platform trailing edge 34 may also fall into a narrower range, for example three to five times platform thickness B ($3.0\, B \leq A \leq 5.0\, B$), or about four times platform thickness B ($A \approx 4.0\, B$), within a tolerance of 2-5% of platform thickness B, or 10% of platform thickness B.

Together, flowpath contour regions 70, 72 and 74 span 100% of axial length A, but the individual lengths may vary. For example, regions 70, 72 and 74 may each span at least 10% of axial length A, so each individual region 70, 72 and 74 varies between 10% and 80% of axial length A. Alternatively, the contours may be somewhat more evenly divided, for example with individual regions 70, 72 and 74 spanning 20-50% of axial length A, or 30-40% of axial length A, and summing to 100% of axial length A.

FIG. 3B is a schematic diagram illustrating different curvatures for upstream convex segments 70 and 70' of stator or rotor platform trailing edge 34 (or 54, see FIG. 1B). As shown in FIG. 3B, different radii of curvature R1, R1' may be defined at different points P1, P1', positioned variously with respect to upstream contour transition T1. In addition, the different radii of curvature R1, R1' may correspond to flowpath regions 70, 70' having different axial lengths, as defined from upstream transition T1 to intermediate transitions T2, T2'.

In particular examples, radius of curvature R1 may be approximately $R1 \approx B$, for example as defined at point P1, with first contour region 70 extending from upstream transition T1 to intermediate transition T2. Alternatively, radius of curvature R1' may be approximately $R1' \approx B/2$, as defined at point P1', and first contour region 70 may extend from transition T1 to transition T2'.

More generally, convex radius of curvature R1 (or R1') may vary from one-quarter to twice radial height B; that is, with $0.25\, B \leq R1$ (or $R1'$) $\leq 2.0\, B$. Radius R1 (or R1') may also be expressed in terms of elliptical rather than circular curvature, for example with a ratio of semi-major to semi-minor axis in the range of 1:1 to 4:1, or in another similar or substantially equivalent form. In some of these applications, radius of curvature R1 may vary along upstream flowpath region 70, for example within the range $0.25\, B \leq R1$ (or $R1'$) $\leq 2.0\, B$ between transition T1 and transition T2.

The curvature of downstream region 74 also varies, for example with convex radius of curvature $0.25\, B \leq R3 \leq 2.0\, B$. Alternatively, downstream region 74 may have higher radius of curvature $R3 \geq 2.0\, B$, $R3 \geq 5.0\, B$ or $R3 \geq 10.0\, B$. In some designs, radius of curvature R3 is arbitrarily high and third flowpath region 74 is substantially straight, for example as shown in FIG. 4A or FIG. 4B, below.

The curvature of intermediate or spline region 72 varies with the corresponding curvatures of upstream (convex) region 70 (or 70') and downstream (concave or linear) region 74, in order to match the slope of the flowpath contour across transitions T2 and T3. More generally, the shape of the flowpath contour in intermediate region 72 is selected together with the corresponding flowpath contours in upstream and downstream regions 70 (or 70') and 74, in order to improve flow efficiency along full axial length A of platform trailing edge 34. The flowpath contours along regions 70 (or 70'), 72 and 74 of platform trailing edge 34 are also selected to reduce losses and improve cooling efficiency downstream of trailing edge segment 64, in order to improve turbine performance in the downstream rotor stage, as shown in FIGS. 5B and 6B.

FIG. 4A is a schematic diagram illustrating a linear geometry for downstream region 74 of stator or rotor platform trailing edge 34 (or 54, see FIG. 1B). As shown in FIG. 4A, the radius of curvature may be arbitrarily high in downstream region 74, between transition T3 and downstream end 64 of ID platform 26 (for example, in a limit R3 goes to an arbitrarily high value, represented as "∞"). In this configuration, intermediate spline region 72 may be substantially linear across transition T3 to downstream region 74, and have curvature from transition T3 to transition T2 in order to match the slope of upstream (convex) region 70.

FIG. 4B is a schematic diagram illustrating an angled geometry for undersurface 66 of stator or rotor platform trailing edge 34 (or 54, see FIG. 1B). In this configuration, undersurface 66 of trailing edge portion 34 makes angle α at transition T4 with respect to upstream undersurface 67, for example at least two degrees ($\alpha \geq 2°$), in order to increase or decrease height or thickness b along vertical end segment 64 of ID platform 26.

In addition, height b of end segment 64 and the slope of substantially linear downstream region 74 may also be selected to match the slope and position of upstream (convex) region 70 at transition T2, as shown in FIG. 4B. In this configuration, the flowpath contour may be substantially straight or linear from transition T2 through intermediate region 72 to transition T3, and from transition T3 through downstream region 74 to downstream end 64 of platform trailing edge 34.

The configuration of ID rotor or stator platform 26 thus varies along trailing edge region 34, as described above, and as shown in the figures. The contour of flowpath 62, moreover, is not limited to the particular variations that are shown, and may also include different combination of the different features that are described. In particular, flowpath segments 70, 72 and 74 may have different arcuate, splined, convex, concave and linear contours, in combination with different straight and angled geometries for undersurface 66, and different heights b along downstream end 64 of platform trailing edge portion 34, with different axial lengths A.

Figure 5A:
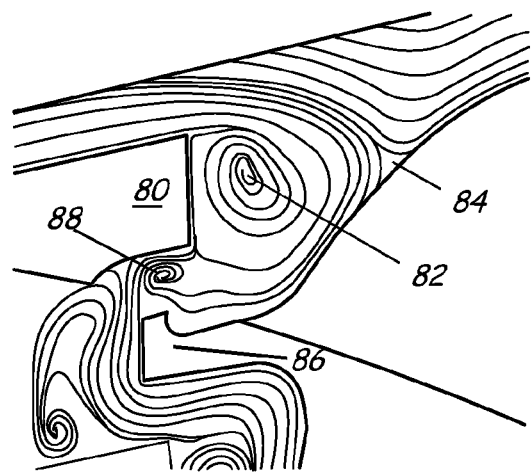
FIG. 5A is a schematic diagram illustrating working fluid flow along an airfoil platform trailing edge.
Figure 5B:
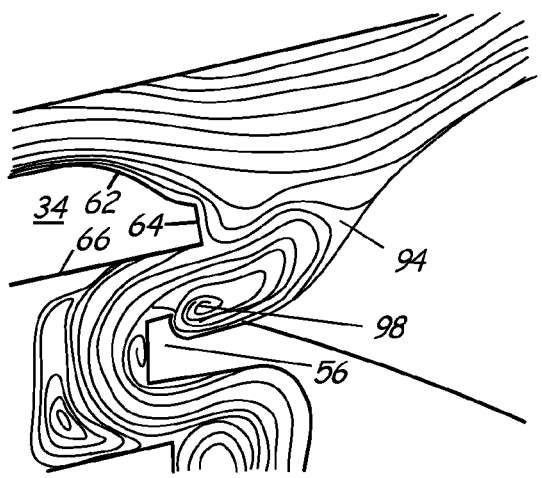
FIG. 5B is a schematic diagram illustrating working fluid flow along a contoured platform trailing edge.

FIG. 5A is a schematic diagram illustrating working fluid flow along trailing edge portion 80 of an ID stator or rotor platform. Depending on application, the working fluid flow in FIG. 5A may be represented either in transient or steady-state terms, for example via streamlines or streaklines generated by computational fluid dynamics (CFD) or other simulation methods.

As shown in FIG. 5A, platform trailing edge 80 generates a relatively large circulation or vortex flow zone 82, bounded between stagnation point 84 and the downstream end of platform trailing edge 80, and by seal structure 86 on the downstream rotor or stator stage. In addition, secondary vortex 88 forms between seal process 86 and platform trailing edge 80, potentially resulting in hot gas ingestion and obstruction of cooling fluid flow to the downstream stage. As a result, turbine efficiency decreases and the cooling load increases.

FIG. 5B is a schematic diagram illustrating working fluid flow along contoured trailing edge stator or rotor platform portion 34. As shown in FIG. 5B, contoured flowpath surface 62 improves flow efficiency along platform trailing edge 34, and in the transition zone between upstream stator stage airfoils 12 and downstream rotor stage airfoils 14, as shown in FIG. 1A, or upstream rotor stage airfoils 14 and downstream stator stage airfoils 12, as shown in FIG. 1B.

In particular, contoured flowpath 62 results in substantially less circulation between downstream end 64 of platform trailing edge 34 and stagnation point 94, for reduced losses and improved efficiency. In addition, stagnation point 94 is translated upstream, toward downstream end 64 of platform trailing edge 34, and secondary vortex 98 is translated downstream and radially inward to a position adjacent the upper surface of seal process 56. In additional designs other combinations of one or more of these flow features is provided, in order to further reduce losses and improve cooling efficiency, for example along the root section and ID platform of the downstream rotor blades or stator vanes.

Undersurface 66 of platform trailing edge 34 may also be angled upward or downward, as described above, in order to increase or decrease the spacing between seal process 56 (or 57, see FIG. 1B) and platform trailing edge 34. Whether considered alone or in combination with the shift of secondary vortex 98 away from downstream edge segment 64, and the other flow effects described above, this design further improves cooling efficiency by reducing mixing and increasing cooling fluid coverage along the ID flowpath of the downstream rotor or stator stage.

Fluid flow and fluid dynamics are highly nonlinear fields, however, making it difficult to form generalized predictions regarding the results of any particular platform geometry on downstream losses and efficiency. In addition, computational fluid dynamics calculations typically require a combination of finite element method (FEM) and finite element analysis (FEA) techniques, and other advanced non-linear methods, making it difficult to accurately predict the impact of particular changes to platform geometry on practical variables such as turbine efficiency and gas flow path temperatures.

The design of stator or rotor platform trailing edge 34 thus poses a number of difficult engineering challenges, requiring constant tradeoffs between the different potential configurations of flowpath 62, trailing edge segment 64 and undersurface 66. It is impossible, moreover, to enumerate all the different design choices that can be made, and there may be substantial differences between predictions based on elementary fluid dynamics and simple flow models, as compared to detailed non-linear CFD analysis based on FEM and FEA techniques. This is true both with respect to fluid flow, as described in FIGS. 5A and 5B, and with respect to the downstream gas path temperatures, as shown in FIGS. 6A and 6B.

Figure 6A:
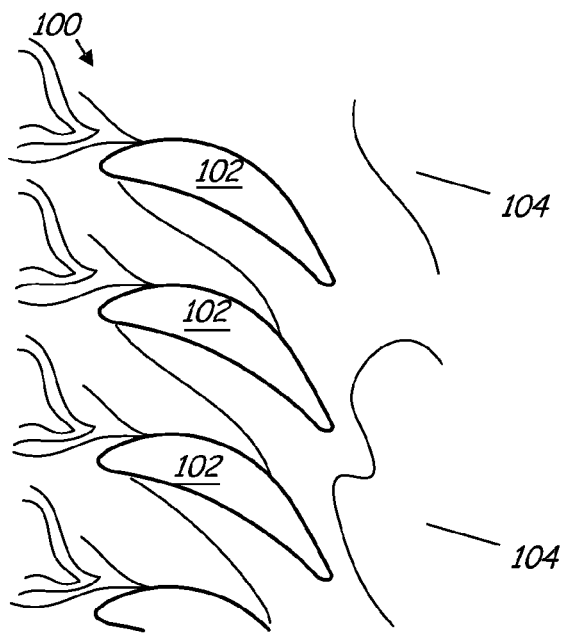
FIG. 6A is a schematic diagram illustrating working fluid temperatures downstream of an airfoil platform trailing edge.
Figure 6B:
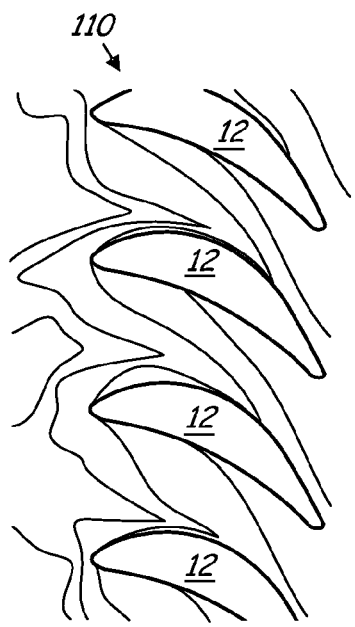
FIG. 6B is a schematic diagram illustrating working fluid temperatures downstream of a contoured platform trailing edge.

FIG. 6A is a schematic diagram illustrating temperature contours in the working fluid flow downstream of (e.g., stator or rotor) stage 100, with stator (vane) or rotor (blade) airfoils 102. The temperature contours can be generated by simulation methods, for example using complex nonlinear computational fluid dynamics, as described above, and the results may be expressed either in time averaged or transient form.

The temperature contours of FIG. 6A are taken along an inner diameter section of (e.g., rotor or stator stage) 110, proximate the ID stator platform or rotor hub section. As shown in the particular example of FIG. 6A, rotor or stator airfoils 102 generate substantial hot spots or high-temperature regions 104, due to vortex flow and other loss mechanism that lead to reduced cooling efficiency, as described above. Hot spots 104 indicate losses and thermal stress, reducing efficiency and increasing the cooling load.

FIG. 6B is a schematic diagram illustrating temperature contours in the working fluid flow downstream of stator or rotor stage 110. Rotor or stator stage 110 utilizes airfoils with a contoured platform trailing edge portion 34, as described above, for example stator stage airfoils 12, as shown in FIG. 6B, or, alternatively, rotor stage airfoils 14 with contoured platform trailing edge portion 54, as shown in FIG. 1B.

In the particular example of FIG. 6B, the contoured platform trailing edges (e.g., 34 or 54) provided in stator or rotor stage 110 substantially reduce hotspot formation, lowering peak gas path temperatures along the downstream rotor or stator stage. Contoured platform trailing edges on rotor or stator stage 110 also reduce the downstream cooling load, increasing reliability and service life.

While the invention is described with reference to exemplary embodiments, it will be understood by those skilled in the art that various changes may be made and equivalents may be substituted without departing from the spirit and scope of the invention. In addition, different modifications may be made to adapt the teachings of the invention to particular situations or materials, without departing from the essential scope thereof. The invention is thus not limited to the particular examples disclosed herein, but includes all embodiments falling within the scope of the appended claims.

The invention claimed is:

1. An airfoil with a platform, the platform comprising:
   a leading edge portion; and
   a trailing edge portion aft of a trailing edge of the airfoil, the trailing edge portion comprising:
      a first region having a convex flowpath contour that begins aft of the trailing edge of the airfoil;
      a second region having an intermediate flowpath contour extending downstream from the convex flowpath contour; and
      a third region having a concave or linear flowpath contour extending downstream from the intermediate flowpath contour to a downstream end of the trailing edge portion.

2. The airfoil with the platform of claim 1, wherein the convex flowpath contour and the intermediate flowpath contour have matching slopes at a transition between the first region and the second region, and wherein the intermediate flowpath contour and the concave or linear flowpath contour have matching slopes at a transition between the second region and the third region.

3. The airfoil with the platform of claim 2, wherein the intermediate flowpath contour is convex adjacent the first region and concave adjacent the third region.

4. The airfoil with the platform of claim 1, wherein the convex flowpath contour of the first region has a radius of curvature between one quarter and twice a radial height of the trailing edge portion, the radial height defined between an undersurface of the platform and a transition to the first region.

5. The airfoil with the platform of claim 4, wherein the concave flowpath contour of the third region has a radius of curvature between one quarter and twice the radial height of the trailing edge portion.

6. The airfoil with the platform of claim 1, wherein the third region has a substantially linear flowpath contour extending from the second region to the downstream end of the trailing edge portion.

7. The airfoil with the platform of claim 6, wherein the second region has a substantially linear flowpath contour extending from the first region to the third region.

8. The airfoil with the platform of claim 1, further comprising a platform undersurface, wherein the platform undersurface extends along the trailing edge portion and defines an angle of at least two degrees with respect to the platform undersurface extending upstream of the trailing edge portion.

9. A stator airfoil comprising an inner diameter platform as recited in claim 1.

10. A turbine or compressor stage comprising a plurality of circumferentially arranged stator airfoils as recited in claim 9, and further comprising a plurality of rotor airfoils circumferentially arranged downstream of the stator airfoils.

11. The turbine or compressor stage of claim 10, each of the rotor airfoils comprising an inner diameter platform having a seal process, the seal process extending axially upstream to a position located radially inward of the trailing edge portion of the inner diameter platform of the stator airfoil.

12. A rotor airfoil comprising an inner diameter platform as recited in claim 1.

13. A turbine or compressor stage comprising a plurality of circumferentially arranged rotor airfoils as recited in claim 12, and further comprising a plurality of stator airfoils circumferentially arranged downstream of the rotor airfoils.

14. The turbine or compressor stage of claim 13, each of the stator airfoils comprising an inner diameter platform having a seal process, the seal process extending axially upstream to a position located radially inward of the trailing edge portion of the inner diameter platform of the rotor airfoil.

15. The airfoil with the platform of claim 1, wherein the trailing edge portion of the platform is axisymmetric.

16. An airfoil comprising:
   pressure and suction surfaces extending axially from a leading edge to a trailing edge and radially from an inner section to an outer section; and
   a platform adjacent the inner section, the platform having a trailing edge section with a contoured flowpath aft of the trailing edge, the contoured flowpath comprising:
      an upstream region with a convex contour that begins aft of the trailing edge of the airfoil;
      an intermediate region with a continuous contour extending downstream from the convex contour of the upstream region; and
      a downstream region with a concave or linear contour extending from the intermediate region to a downstream end of the platform.

17. The airfoil of claim 16, wherein the trailing edge section of the platform extends for an axial length along the upstream region, the intermediate region and the downstream region, and wherein the axial length is at least twice times a radial thickness of the trailing edge section of the platform.

18. The airfoil of claim 17, wherein each of the upstream region and the downstream region has a radius of curvature between one fourth of the radial thickness of the trailing edge section and twice the radial thickness of the trailing edge section, inclusive.

19. The airfoil of claim 16, wherein the continuous contour of the intermediate region has a first slope matching the convex contour of the upstream region, and a second slope matching the concave or linear contour of the downstream region.

20. The airfoil of claim 19, wherein the continuous contour of the intermediate region is convex adjacent the convex contour of the upstream region and concave or linear adjacent the concave or linear contour of the downstream region.

21. The airfoil of claim 16, wherein the undersurface of the platform is angled to decrease a vertical height of the downstream end of the platform.

22. An airfoil comprising:
   pressure and suction surfaces extending axially from a leading edge to a trailing edge and radially from an inner section to an outer section;
   an outer diameter platform adjacent the outer section; and an inner diameter platform adjacent the inner section, the inner diameter platform having a leading edge portion and a trailing edge portion, the trailing edge portion beginning aft of the trailing edge and comprising:
- an upstream flowpath region having a convex contour;
- a downstream flowpath region having a concave or linear contour; and
- an intermediate flowpath region extending between the upstream flowpath region and the downstream flowpath region, the intermediate flowpath region having a first slope matching the convex contour of the upstream flowpath region and a second slope matching the concave or linear contour of the downstream flowpath region.

23. The airfoil of claim 22, wherein the downstream flowpath region has a substantially linear contour extending to a downstream end of the inner diameter platform.

24. The airfoil of claim 23, wherein the intermediate flowpath region has a substantially linear contour extending from the upstream flowpath region to the downstream flowpath region, such that the first and second slopes are substantially equal.

25. A stator stage comprising a plurality of circumferentially arranged airfoils as recited in claim 22.

* * * * *